United States Patent [19]

Czubek

[11] Patent Number: 5,217,338
[45] Date of Patent: Jun. 8, 1993

[54] TWIST TYPE LOCKING PIN

[75] Inventor: Richard S. Czubek, Cudahy, Wis.

[73] Assignee: Kickhaefer Manufacturing Company, Port Washington, Wis.

[21] Appl. No.: 804,847

[22] Filed: Dec. 6, 1991

[51] Int. Cl.$^5$ ............................................. F16B 21/14
[52] U.S. Cl. .................................... 411/343; 411/358; 411/514
[58] Field of Search ............... 411/343, 352, 353, 358, 411/513-517, 530

[56] References Cited

U.S. PATENT DOCUMENTS

| | | | |
|---|---|---|---|
| 3,175,453 | 3/1965 | Williams | 411/352 |
| 4,205,586 | 6/1980 | MacNeill | 411/530 |
| 4,298,299 | 11/1981 | Quarles | 411/514 |
| 4,592,689 | 6/1986 | Leitzke | 411/358 |

FOREIGN PATENT DOCUMENTS

| | | | |
|---|---|---|---|
| 487623 | 7/1918 | France | 411/513 |
| 1369526 | 7/1964 | France | 411/514 |
| 45221 | 3/1919 | Sweden | 411/514 |
| 123461 | 2/1919 | United Kingdom | 411/514 |

*Primary Examiner*—Peter M. Cuomo
*Assistant Examiner*—Suzanne L. Dino
*Attorney, Agent, or Firm*—Foley & Lardner

[57] ABSTRACT

A twist type locking pin formed from a single piece of wirelike stock having a U-shaped bend forming two sides, one side being bent to form an arcuate loop which terminates short of the other side and is bent at an angle to cross over the other side, the other side being bent to form an arcuate loop which lies in a plane perpendicular to the plane of the first arcuate loop, the end of the second arcuate loop overlying the one side, the second arcuate loop forming a bearing surface at the end of the other side, the second loop forcing the other side outwardly from the one side on insertion of the one side into a post, the other side producing a bias force which rotates the one side through 90° when the end of the other side clears the post to pivot the locking pin to a locking position.

1 Claim, 2 Drawing Sheets

TWIST TYPE LOCKING PIN

FIELD OF THE INVENTION

This invention relates to locking pins generally and more particularly to a twist type locking pin for a drilled shaft or stud.

BACKGROUND OF THE INVENTION

Various forms of locking pins are used to lock a post or stud in an opening in various types of fasteners used in types of structural assemblies. The pin must provide a positive lock for personal and equipment protection reasons. Each type of pin is designed to prevent inadvertent or accidental release of the pin from the fastener. Typical examples of prior art devices are described in U.S. Pat. No. 4,592,689, entitled "Ring Spring Cotter," issued to Rue S. Leitzke, on Jun. 3, 1986. This pin is in the form of a figure 8 and lies on top of the bolt to which it is attached. The pin requires bending of the end of the pin to lock the pin in position.

U.S. Pat. No. 4,298,299, entitled "Hairpin Cotter Key," issued to James R. Quarles, on Nov. 3, 1981. This pin may be inserted anywhere along the length of the bolt, however it does not provide a mechanical lock and can be removed by merely pulling the pin off of the bolt.

U.S. Pat. No. 3,175,453, entitled "Locking Pin Assembly Having A Spring Clip," issued to Thomas G. Williams, on Mar. 30, 1965. This pin is also applied by a straight push in and release by a straight pull from the pin.

SUMMARY OF THE PRESENT INVENTION

The present invention relates to a twist type locking pin which provides a positive locking action as the pin is inserted into the opening. The twist type locking pin is adaptable to any application where a mechanical locking action is required to prevent inadvertent removal of the pin.

The present invention contemplates a twisting action of the pin which is effective in providing a positive mechanical lock that cannot be released without a twisting action. The pin is, therefore, not susceptible to release and is capable of maintaining a positive lock. The pin relies on an automatic twist characteristic rather than spring tension or memorylike properties of its materials to remain in place. Due to the absence of any stress after being installed it does not undergo any significant loss in tension or memory in application.

In use, the locking pin can be quickly and easily attached at any point on a shaft or stud. The pin is attached by aligning the pin with a hole drilled in the stud and applying pressure to the pin which causes an arcuate loop on the pin to be forced outwardly until the loop clears the shaft or stud. The bias force built up in the loop causes the pin to rotate approximately 90° with the loop encircling the shaft or stud. The pin cannot be removed from the shaft or stud without rotating the pin 90° to force the arcuate loop outward until the end of the loop clears the stud or shaft. It should be noted that the pin can be installed without special tools and is self-fitting, self-retaining and provides positive locking.

Other principal features and advantages of the invention will become apparent to those skilled in the art upon review of the following drawings, the detailed description and the appended claims.

Figure 3:
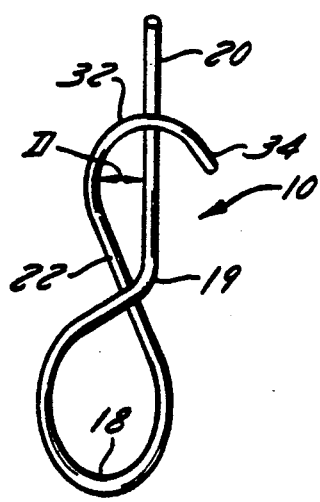
FIG. 3 is a view of the locking pin.
Figure 4:
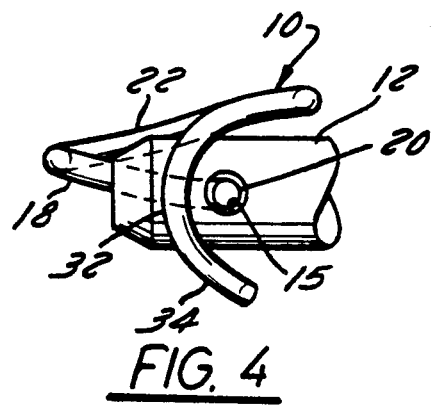
FIG. 4 is an end view of the locking pin shown in FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1:
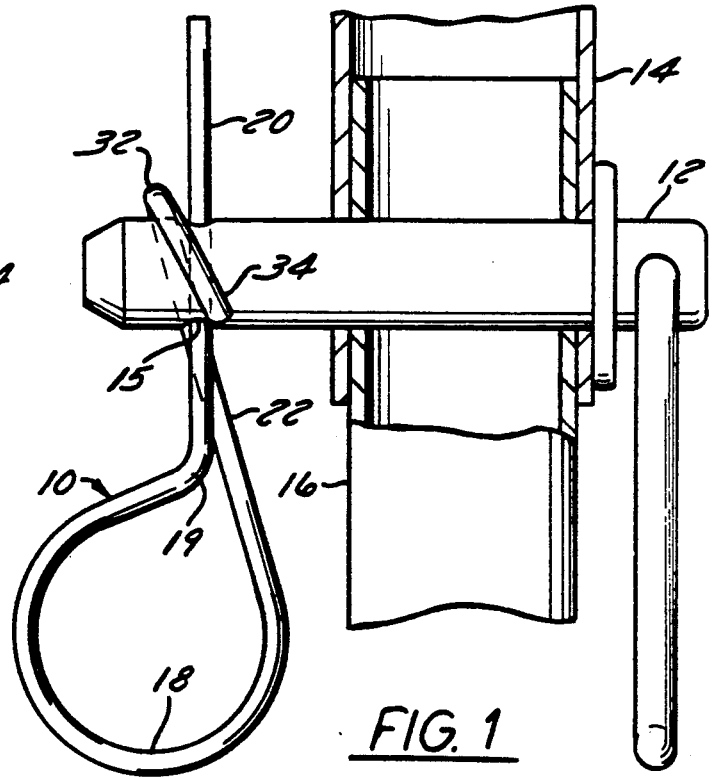
FIG. 1 is a view partially in section showing the locking pin according to the invention locked onto the end of a post or bolt.
Figure 7:
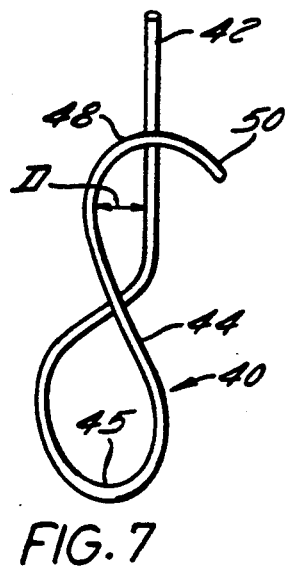
FIG. 7 is a view of the second embodiment of the locking pin.

Referring to FIG. 1 of the drawing the twist type locking pin 10 is shown mounted on a post 12 which is used to join two telescoping members 14 and 16. It should be apparent that the concept of using a post 12 to connect two members is generally understood. The locking pin 10 in one form of the invention can be used to simply and easily lock the post in the telescoping members. As seen in FIG. 1 the locking pin is locked to the post, since it cannot be removed by a simple pull axially from the post. The locking pin provides a positive attachment which can only be mounted on or released from the post by the rotation of the pin as described hereinafter.

The locking pin 10 may be fabricated from any suitable material depending on the intended use of the pin. The pin requires a minimum of force to mount the pin in the post and is locked on the post by its form. Since the pin does not require any bias force to remain on the post, the pin does not lose any of its physical property in use.

In a preferred embodiment, the locking pin 10 is bent into a U-shape with one side 20 being equal to or longer than the other side 22. The side 20 is further bent to form a first arcuate loop 18 which terminates short of the side 22. The side 20 is then bent at 19 to form a straight run. The side 22 forms a run that underlies the side 20 as shown in FIG. 1. The end of side 22 is bent back to form an arcuate loop 32 that lies in a plane substantially perpendicular to the plane of the first loop 18. The end 34 of loop 32 overlies the side 20.

Figure 2:
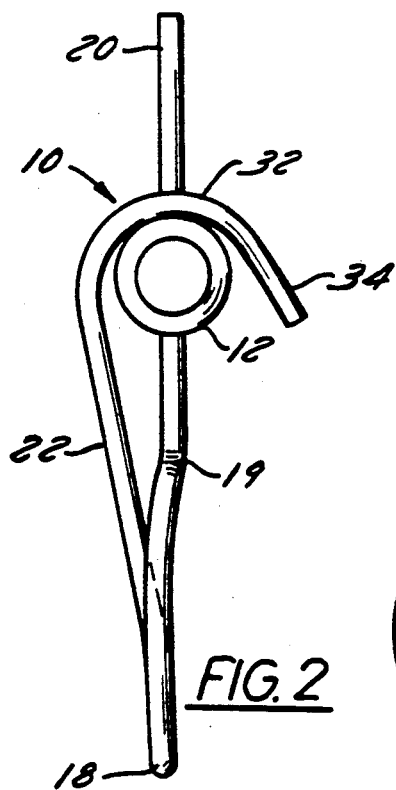
FIG. 2 is an end view of the post showing the locking pin mounted on the post.

The side of the arcuate loop 32 adjacent the side 20 forms a bearing surface which bears against the post 12 when the straight side 20 is inserted into the hole 15 in the post. As the side 20 is pushed through the hole 15 in the post 12 the arcuate loop 32 will be forced outwardly from the side 20. As the end 34 of loop 32 clears the post the bias introduced into the side 22 by the outward movement of the arcuate loop 32 pivots the locking pin 10 around the side 20 in the opening 15 to the position shown in FIG. 2 with the arcuate loop 32 encircling the post. The distance "D" between the side 22 and the side 20, FIG. 3, provides the bias force which causes the locking pin to rotate about the side 22. The locking pin is thereby permanently locked to the post and cannot be released until rotated to a position sufficient to clear the end 34 of the arcuate loop 32 from the post 12. The locking pin can then be pulled outward from the opening in the post to remove the locking pin from the post.

In the alternate embodiment shown in FIGS. 5 through 10, a locking pin 40 is shown mounted in an opening 15 of post 12 as described above. In this embodiment of the invention the stock is bent into a U-shape having a side 42 which is longer than the side 44. The side 42 is further bent to form an arcuate loop 45 which underlies the side 44 and is then bent to form the straight side 42 which passes through the opening in the post. The other side 44 is bent back to form an arcuate loop 48 that overlies the side 42 and terminates at 50. In this embodiment the arcuate loop 48 lies in substantially the same plane as loop 45. The pin 40 is also rotated in order to insert or release the pin from the post 12.

Figure 8:
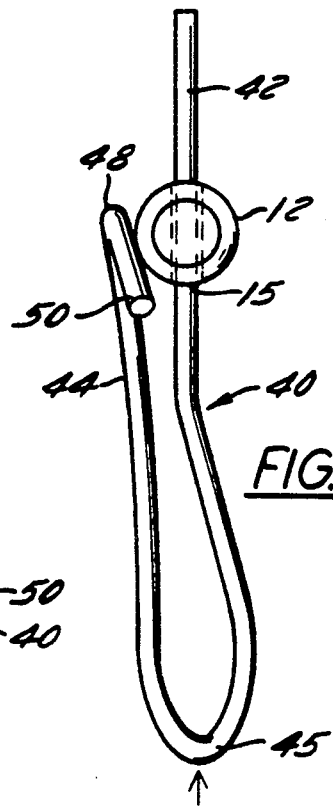
FIG. 8 is a view of the locking pin shown partially inserted in the pin or post.
Figure 9:
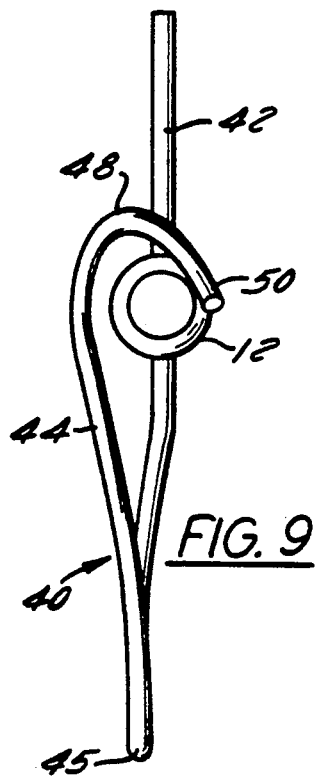
FIG. 9 is a view of the locking pin shown partially rotated to the locking position.
Figure 10:
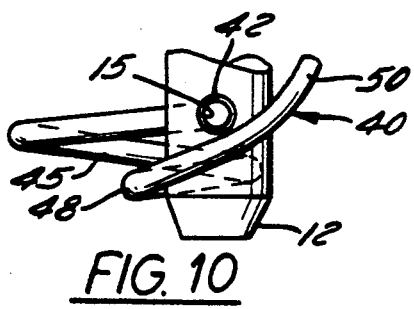
FIG. 10 is a view of the end of the post with the locking pin in the locked position.
Figure 6:
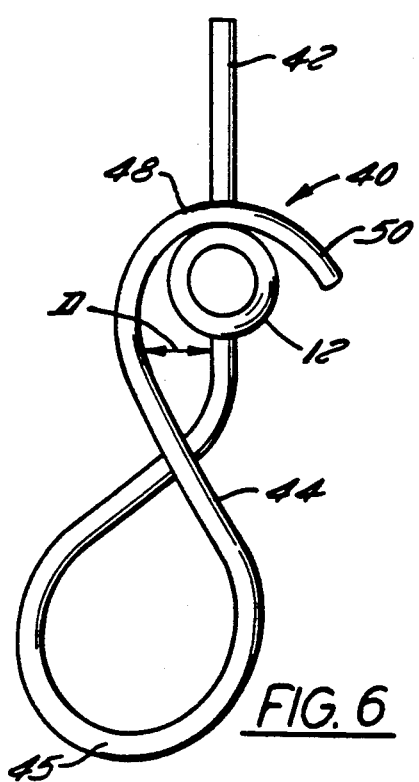
FIG. 6 is an end view of the post showing the locking pin mounted on the stud or post.
Figure 5:
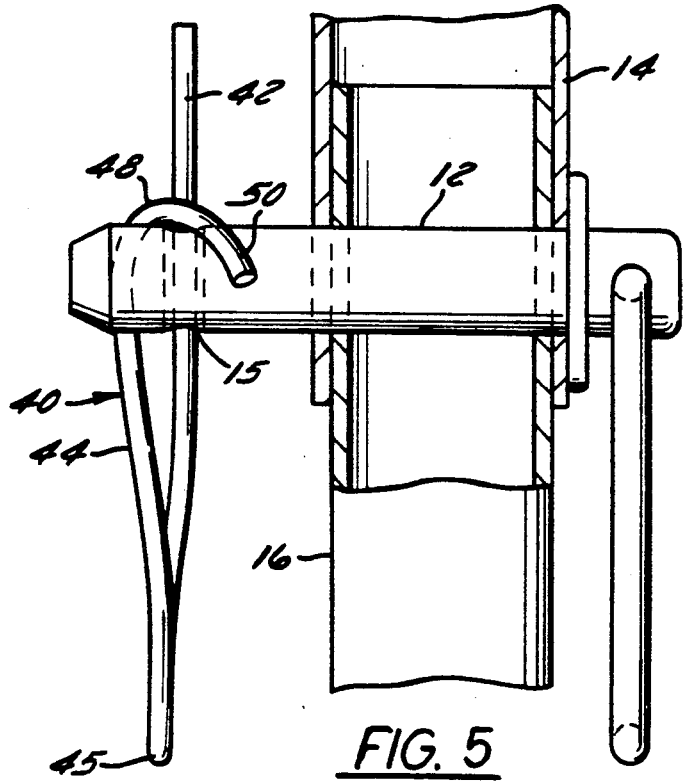
FIG. 5 is a view of a second embodiment of the locking pin according to the invention shown mounted on the end of a pin or post.

In this regard and referring to FIGS. 8 and 9 the side 42 is shown inserted into the opening 15 in the post 12 with the arcuate loop 48 bearing against the side of the post. As the pin is pushed through the opening of the post, the arcuate loop 48 on side 44 will be forced outwardly until the end 50 of the loop clears the side of the post 12. The side 44 bears against the side of the post causing the locking pin 40 to rotate about side 42 as the end 50 of loop 48 clears the post. The loop 48 will permanently lock the locking pin on the post as seen in FIG. 6. The locking pin is released by again rotating the pin about side 42 in hole 15 to bring the side 44 into contact with the side of the post and thus biasing the arcuate loop 48 outwardly from the side 42 until the end 50 clears the post. The side 42 can then be pulled through the opening.

Thus, it should be apparent that there has been provided in accordance with the present invention a twist type locking pin that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A twist type locking pin for securing a post in a structural assembly, said pin comprising a single piece of wirelike stock having a bend to form a first side which terminates at a first end and a second side which terminates at a second end, said first side and second side lying in a common plane, said first side being bent to form an arcuate loop which terminates short of said second side, said first end of said first side being bent at an angle to cross over said second side, said second side being bent to form a second arcuate loop which lies in a plane perpendicular to the plane of said first and second sides, the second arcuate loop, adjacent the second end of said second side, overlying said first side, the second arcuate loop thus forming a bearing surface at said second end of said second side, said second arcuate loop forcing said second side outwardly from said first side on insertion of said first side into the post, whereby a bias force is introduced into said second side which rotates said first side through 90° when the second end of said second side clears the post to pivot the locking pin to a locking position with the second arcuate loop encircling the post.

* * * * *